United States Patent
Kim et al.

(10) Patent No.: US 11,514,010 B2
(45) Date of Patent: Nov. 29, 2022

(54) DEDUPLICATION-ADAPTED CASEDB FOR EDGE COMPUTING

(71) Applicant: INHA-INDUSTRY PARTNERSHIP INSTITUTE, Incheon (KR)

(72) Inventors: Deokhwan Kim, Incheon (KR); Khikmatullo Tulkinbekov, Incheon (KR); Joohwan Kim, Incheon (KR)

(73) Assignee: INHA-INDUSTRY PARTNERSHIP INSTITUTE, Incheon (KR)

( * ) Notice: Subject to any disclaimer, the term of this patent is extended or adjusted under 35 U.S.C. 154(b) by 0 days.

(21) Appl. No.: 17/211,973

(22) Filed: Mar. 25, 2021

(65) Prior Publication Data
US 2021/0349866 A1   Nov. 11, 2021

(30) Foreign Application Priority Data
May 6, 2020   (KR) .................. 10-2020-0053848

(51) Int. Cl.
*G06F 16/215* (2019.01)
*G06F 16/174* (2019.01)

(52) U.S. Cl.
CPC ........ *G06F 16/215* (2019.01); *G06F 16/1744* (2019.01)

(58) Field of Classification Search
None
See application file for complete search history.

(56) References Cited

U.S. PATENT DOCUMENTS

| 8,290,972 B1* | 10/2012 | Deshmukh ........ G06F 16/24556 707/758 |
| 9,659,060 B2* | 5/2017 | Chambliss ............. G06F 3/067 |
| 2010/0077013 A1* | 3/2010 | Clements ............ G06F 16/1748 707/822 |
| 2014/0115182 A1* | 4/2014 | Sabaa ..................... H04L 69/08 709/232 |
| 2017/0177266 A1* | 6/2017 | Doerner ................ G06F 3/0689 |
| 2018/0113767 A1* | 4/2018 | Pogosyan ........... G06F 11/1453 |
| 2020/0333968 A1* | 10/2020 | Bortnikov ............. G06F 3/0685 |
| 2021/0271644 A1* | 9/2021 | Chinthekindi ...... G06F 11/1464 |

FOREIGN PATENT DOCUMENTS

KR    10-2019-0100537    8/2019

OTHER PUBLICATIONS

Lu et al., "BloomStore: Bloom-Filter based Memory-efficient Key-Value Store for Indexing of Data Deduplication on Flash" 2013 (Year: 2013).*
Tulkinbekov, K. et al., "CLeveldb: Coaleseed Leveldb for Small Data," Ubiquitous and Future Networks (ICUFN), 2019 Eleventh International Conference on, IEEE, Jul. 2019, vol. 2019, No. 7, pp. 567-569.

* cited by examiner

*Primary Examiner* — Yu Zhao
(74) *Attorney, Agent, or Firm* — Nixon Peabody LLP

(57) ABSTRACT

Disclosed is a data deduplication method for an edge computer. The method is performed in a key-value store, and may include receiving a compaction request occurred from the key-value store to a metadata layer, checking whether deduplication for removing duplicated data is required when compaction of a metadata file is performed in response to the received compaction request, and removing the duplicated data by checking whether the deduplication is required.

5 Claims, 6 Drawing Sheets

| Algorithm 1 Deduplication Extended Compaction |
|---|
| 1: function COMPACT() |
| 2: |
| 3: procedure |
| 4:     if NeedsCompaction() then |
| 5:         while NextLevelSize >= THRESHOLD do |
| 6:             SelectKeyRange() |
| 7:             MetadataCompaction() |
| 8:         SSTableRelocation() |
| 9: |
| 10:         //Deduplication starts here |
| 11:         DedupCheckout() |
| 12:         TOTAL_KEYS ← GetTotalKeys() |
| 13:         DUP_KEYS ← GetDupKeys() |
| 14:         DUP_RATIO ← TOTAL_KEYS / EUP_KEYS |
| 15:         if DUP_RATIO <= DEDUP_THRESHOLD() then |
| 16:             while NextLevel ≠ NULL do |
| 17:                 SelectKeyRange() |
| 18:                 MetadataCompaction() |
| 19:         SSTableRelocaion() |
| 20:         //Deduplication ends here |

DEDUPLICATION-ADAPTED CASEDB FOR EDGE COMPUTING

CROSS-REFERENCES TO RELATED APPLICATIONS

This application is based on and claims priority under 35 U.S.C. 119 to Korean Patent Application No. 10-2020-0053848, filed on May 6, 2020 in the Korean intellectual property office, the disclosure of which is herein incorporated by reference in its entirety.

TECHNICAL FIELD

The following description relates to a key-value store and a method thereof, which perform deduplication for an edge computer.

This research was supported in part by Basic Science Research Program through the National Research Foundation of Korea (NRF) funded by the Ministry of Education (2018R1D1A1B07042602) and in part by Institute for Information & communications Technology Promotion (IITP) grant funded by the Korea government (MSIT) (No. 2019-0-00064, Intelligent Mobile Edge Cloud Solution for Connected Car) in part by Institute for Information & communications Technology Promotion (IITP) grant funded by the Korea government (MSIT) (No. 2019-0-00240, Deep Partition-and-Merge: Merging and Splitting Deep Neural Networks on Smart Embedded Devices for Real Time Inference).

BACKGROUND OF THE INVENTION

Log-structured merge tree (LSM tree)-series key-value stores have become dominating databases for a big data system. The key-value stores provide an interface each to implement, and automatically perform garbage collection by applying a compile procedure on a multi-level structure. A CaseDB provides various advantages by significantly reducing write amplification using a metadata compaction scheme. However, there is a space amplification problem in an update-intensive workload.

Such an LSM tree implements a multi-level structure in which a lower level adopts a greater space than a higher level. New data is first located at the highest level having the smallest space. As the space is filled up, the new data is moved to a lower level through a compaction process. The compaction process merges data of two adjacent levels and then data merged at a lower level. After data is read and compacted according to a specific key range, sorted data is written at a lower level again, and old data at a previous level is deleted.

Through an implementation of the LSM tree structure, the CaseDB does not immediately perform deletion, but delays a deletion task for the compaction process, so that the amount of deprecated data is increased.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments provide a data deduplication-extended compaction method for a key-value store based on CaseDB architecture.

In one aspect, a data deduplication method for an edge computing performed in a key-value store may include receiving a compaction request occurred from the key-value store to a metadata layer, checking whether deduplication for removing duplicated data is required when compaction of a metadata file is performed in response to the received compaction request, and removing the duplicated data by checking whether the deduplication is required.

Checking whether the deduplication is required may include performing a first process of performing compaction of metadata in the key-value store and a second process of relocating string sorted tables (SSTables) based on metadata updated through the first process.

Checking whether the deduplication is required may include continuing the compaction of the metadata for levels reaching a size threshold in the first process and then performing a data deduplication check using a Bloom filter of the metadata when the first process and the second process are completed. The Bloom filter may check whether a key-value item is present without reading the metadata.

Removing the duplicated data may include returning a positive result or a negative result from the Bloom filter when a data deduplication check is performed using the Bloom filter of the metadata, skipping a key when the negative result is returned, and inserting a key into a duplication log (dup_log) file when the positive result is returned.

Removing the duplicated data may include checking a duplicated key of the metadata at a lower level when the data duplication check is performed using the Bloom filter, calculating a duplication ratio, and checking a threshold for checking whether next deduplication is required based on a value of the calculated duplication ratio.

Removing the duplicated data may include determining whether next deduplication for removing duplicated data is required by checking the threshold, extending the compaction of the metadata to a lower level when the value of the duplication ratio is a preset reference or less, and automatically removing the duplicated data.

In another aspect, a key-value store for data deduplication for an edge computer includes at least one processor configured to execute a computer-readable instruction included in a memory. The at least one processor may be configured to receive a compaction request occurred from the key-value store to a metadata layer, check whether deduplication for removing duplicated data is required when compaction of a metadata file is performed in response to the received compaction request, and remove the duplicated data by checking whether the deduplication is required.

According to one embodiment, a data duplication problem can be solved.

According to one embodiment, space amplification can be reduced, and the balance of space amplification and write amplification can be maintained.

According to one embodiment, the balance of space amplification and write throughput can be maintained.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 6 is an example for describing a deduplication-extended compaction algorithm of the key-value store according to an embodiment.

DETAILED DESCRIPTION

While illustrative embodiments have been illustrated and described, it will be appreciated that various changes can be made therein without departing from the spirit and scope of the invention.

Hereinafter, embodiments are described in detail with reference to the accompanying drawings.

An implementation of a deduplication-extended compaction method proposed in an embodiment focuses on removing a space amplification problem of a key-value store (in an embodiment, a CaseDB is described as an example), and provides a stable and flexible key-value (KV) store for a mixed workload application. Such a data deduplication-extended compaction technology solves the problem by performing compaction at a low level when a data deduplication ratio reaches a threshold. Furthermore, the method maintains a reliable balance between space amplification and write amplification. If compaction is executed at a lower level, frequency is not increased, and a delay time is extended. In other words, the data deduplication-extended compaction method proposed in an embodiment does not execute compaction based on data deduplication, but executes data deduplication when each compaction occurs. If compaction with a deduplication check process is delayed, extra input/output (I/O) occurs, but the process affects only duplicated data and significantly reduces a cost compared to the execution of compaction from the beginning.

Figure 1:
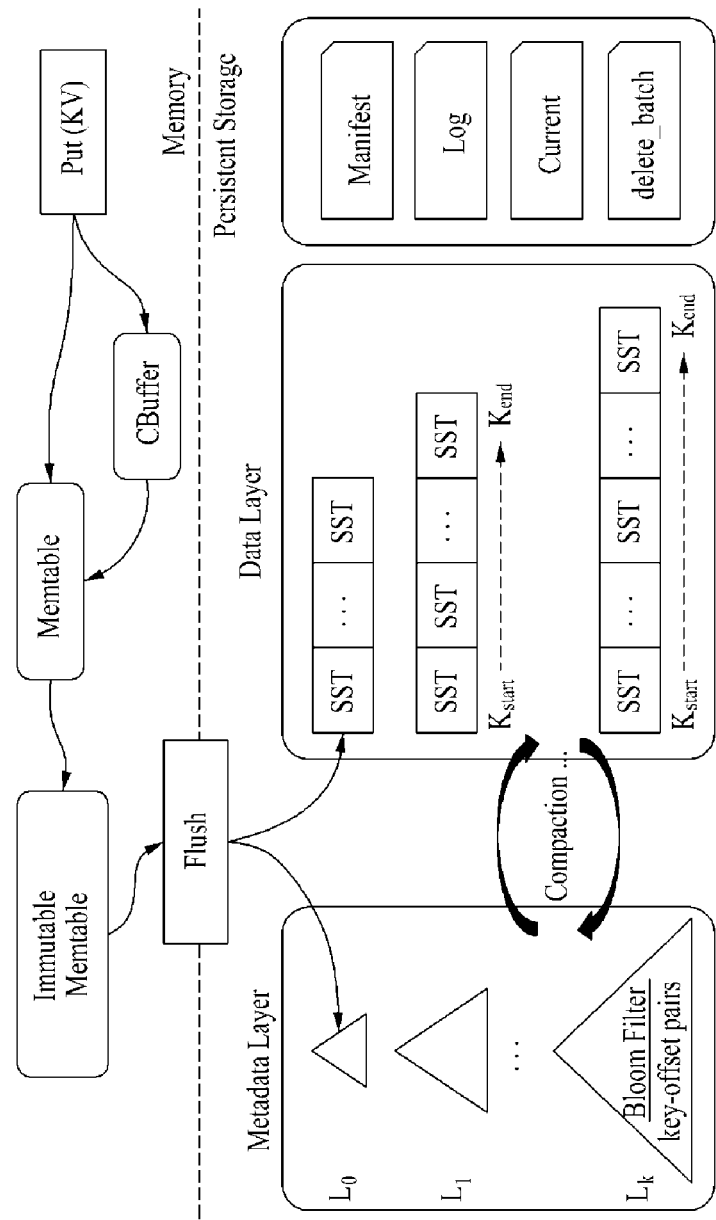
FIG. 1 is a diagram for describing a key-value store according to an embodiment.

FIG. 1 is a diagram for describing a KV store according to an embodiment.

There are some cases where an LSM tree is implemented as a key-value (KV) store. A level DB (LevelDB) may be composed of a multi-level memory, composed of fixed size data units called memtable and string-sorted tables (SSTables), and disk components. Data may be first inserted into a skip tree-based memtable of the multi-level memory, and may be flushed into SSTables of a persistent storage. In a compaction process, after several compactions, when all data reaches the lowest level, the SSTables may be moved to a low level. A RocksDB improves read performance of the LevelDB by applying multi-thread key lookups to a disk level. A case DB (CaseDB) focuses on improving write performance by aggressively separating keys and values and implementing a new metadata layer in a disk. For example, the CaseDB may move a Bloom filter from an SSTable to a metadata file by avoiding small data write using a CBuffer. Furthermore, the CaseDB can reduce write amplification while processing most of compactions in a metadata file, and can reduce unnecessary file I/O in a data layer. The CaseDB is one of the most recent and advanced implementations of an LSM tree among KV stores. As illustrated in FIG. 1, a memtable and an SSTable are inherited from the LevelDB, and extra data units may be used in both memory and disk levels. If the size of a newly inserted key value item is greater than a threshold, first, data may be directly inserted into the memtable. If not, the data may be inserted into a C buffer (CBuffer) in order to merge a plurality of small values into a greater chunk. After metadata for a grouping state is logged, the metadata may be moved to the memtable. When the memtable is filled up, the memtable may be converted into an immutable memtable. In this case, the data is flushed from the memory to the disk. All the memory components may be implemented using a skip list that provides consistent $O(\log(n))$ complexity for all data operations. In a persistent storage, the CaseDB uses two layers for metadata and data configured by a metadata file and SSTables as illustrated in FIGS. 2(a) and 2(b).

Figure 2:
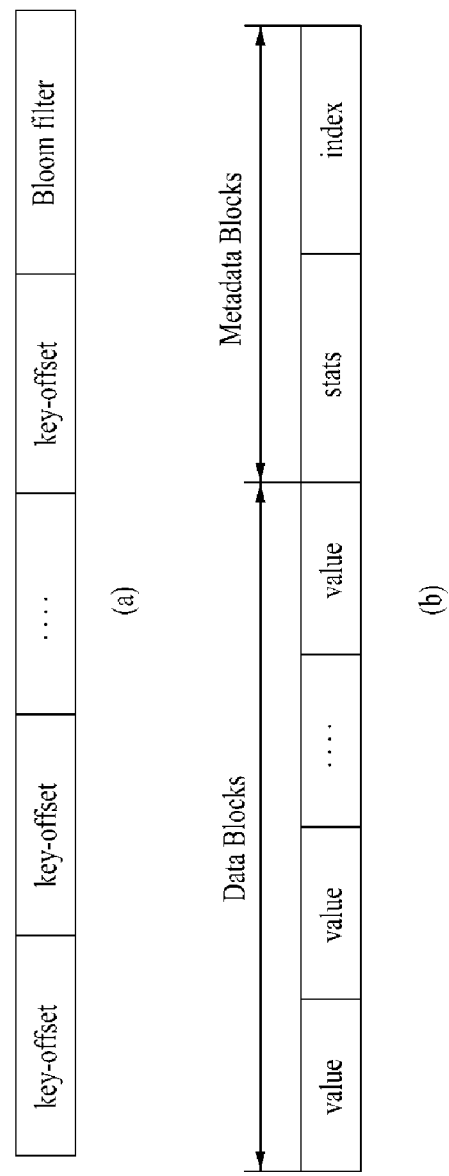
FIG. 2 is a diagram for describing a unit of a key-value store according to an embodiment.

FIG. 2 is a diagram for describing a unit of a KV store according to an embodiment.

In the persistent storage, as illustrated in FIGS. 2(a) and 2(b), the CaseDB may use a plurality of (e.g., two) layers for metadata and data configured by a metadata file and SSTables. Both the layers may implement an LSM tree structure having a plurality of levels. In such an LSM tree structure, each next level is 10 times greater than a previous level based on a current level. When data is flushed, keys are aggressively separated from values, and may be inserted into the metadata layer, that is, offset references to the corresponding value. In order to improve data lookup performance, the Bloom filter may be stored in a metadata file having a key-off set pair. An actual value may be recorded on an SSTable file and located in the data layer. When L0 is filled up, compaction occurs, so that metadata files from L0 and L1 may be rewritten to L1. This procedure continues until each level reaches a maximum size, and metadata files may be moved to lower levels. Once compaction is done with the metadata layer, SSTable files in the data layer may be relocated to corresponding levels following the metadata files. The CaseDB may also use a delete batch log file to keep track of deprecated KV items in the data layer, thus providing data consistency. The delete batch file is initialized during the first part of compaction when only the metadata layer is involved, and may play a crucial role in a next part to remove updated and deleted KV items from the database while the SSTables are relocated. If the metadata compaction and the value relocation are delayed, the write amplification problem of the CaseDB, which is the most vulnerable point of the LevelDB and most of LSM-tree-family KV stores, can be reduced.

A Read process of the CaseDB follows top-down data lookups for a specific key. A searched key may be first checked from memory components in the CBuffer and the memtables. If the searched key is not found in the memory components, the metadata layer may be searched. Starting from the highest level of the metadata layer, only checkout for the Bloom filter may be performed first. When the Bloom filter returns positive, the metadata file may be searched for the key. The Bloom filter may return a positive result even if data does not exist in a set. Accordingly, the key may not be found in the metadata file, and the process may continue to a next level. Once the key is found in the metadata file, reference may be made to an SSTable that holds a value of the key. In an embodiment, it is assumed that the CaseDB guarantees that only one SSTable is read during the read process.

Figure 3:
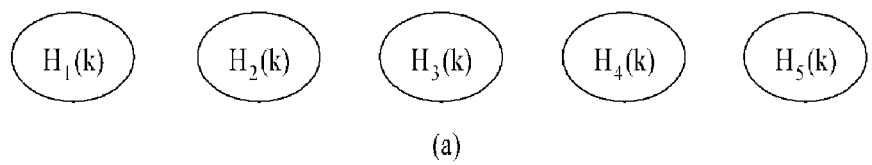
FIG. 3 is an example for describing a Bloom filter in the key-value store according to an embodiment.
Figure 3:
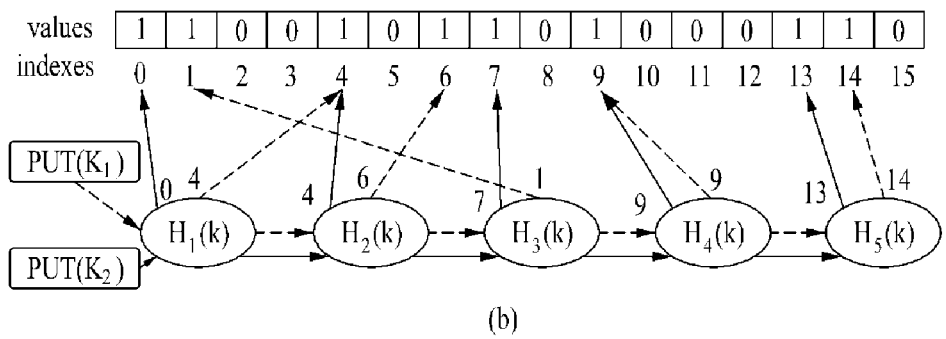
Figure 3:
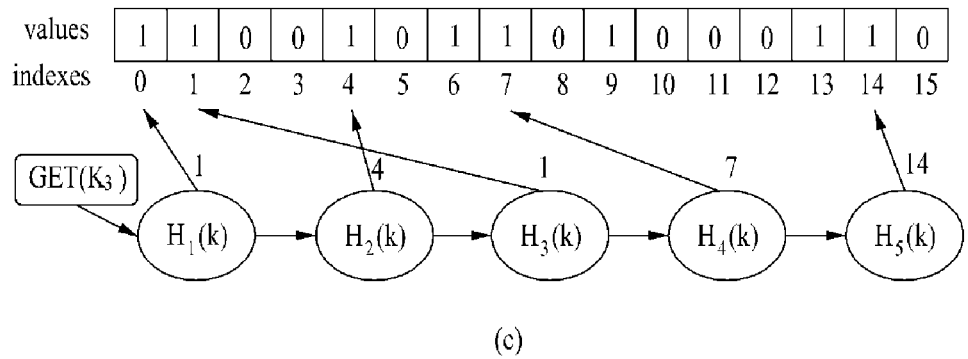

FIG. 3 is an example for describing the Bloom filter in the KV store according to an embodiment.

The Bloom filter is a data structure used to check the existence of a particular item in a set without reading the set.

The Bloom filter is a lightweight and adaptable filter because it requires less disk space allocation compared to other data structures. If the returned feedback is negative, this means that the corresponding item is not present in the set. For these advantages, the Bloom filters are widely used in many applications.

The Bloom filter is a combination of n bits and k hash functions (Hi(k)). FIG. 3 illustrates an example of a Bloom filter having 16 bits and five hash functions. FIG. 3(a) is an example for describing an initialization state. FIG. 3(b) is an example for describing a state after initialization. FIG. 3(c) is an example for describing false positive. As illustrated in FIG. 3(a), values for all bits may be initialized to 0 in the beginning. In the CaseDB, when data is flushed from the memory to the disk, keys may be separated from values and written in metadata files having a corresponding offset. In this process, each key participates in the initialization of a Bloom filter by checking all hash functions (Hi(k)). FIG. 3(b) illustrates an example in which a plurality of (e.g., two) keys is inserted into a Bloom filter using hash functions. Each hash function (Hi(k)) may return a unique number for each key that is smaller than a maximum number of bits in the Bloom filter. A number generated from the hash function (Hi(k)) is considered as an index of the filter, and a corresponding value may be initialized to 1. There is a possibility that the hash function (Hi(k)) may generate a number already initialized by a previous key. Even if a value is already initialized, the value is not altered into 0 again, and 1 may be reassigned to the value. Referring to FIG. 3(b), H2(k) returns 4 for K2, H1(k) returns 4 for K1, and both H2(k) and H1(k) initialize the same bit in a set. All keys may be checked through all hash functions, and a Bloom filter may be initialized.

When the keys are read from the CaseDB, only Bloom filters of metadata may be first checked. A searched key is provided by the same hash functions, and indexes may be returned according to the key. All the hash functions (Hi(k)) may return the same number for the same key. Accordingly, if the key is already inserted, indexes of all the hash functions (Hi(k)) need to be already 1. If a bit value is 0, the Bloom filter comes back as negative. This means that the key is not present in the metadata. If all bits are already 1, the Bloom filter returns a positive result, and may search for a specific key by searching a metadata file. In this way, the Bloom filter provides the possibility of obtaining a prediction about data existence in a set without reading the whole file. However, the Bloom filter may suffer from false positives. In FIG. 3(c), K3 may be searched from the same Bloom filter initialized as described above. K1 and K2 are inserted into the filter, but K3 is not present in the set. In some cases, all hash functions may return indexes to which 1 has already been assigned. Since all values are 1, the Bloom filter may return positive results even though data is not present in the set. Accordingly, the Bloom filter cannot provide trusted information about the existence of an item in the set even if the Bloom filter comes back as positive results, but guarantees that data is not present in the set in the case of negative output. In order to reduce a false positive rate, it is necessary to carefully calculate a Bloom filter size and the number of hash functions based on the number of items in the set. If fixed-size metadata files are used, the number of keys of metadata is limited, and the CaseDB always maintains the false positive rate at a low percentage.

Figure 4:
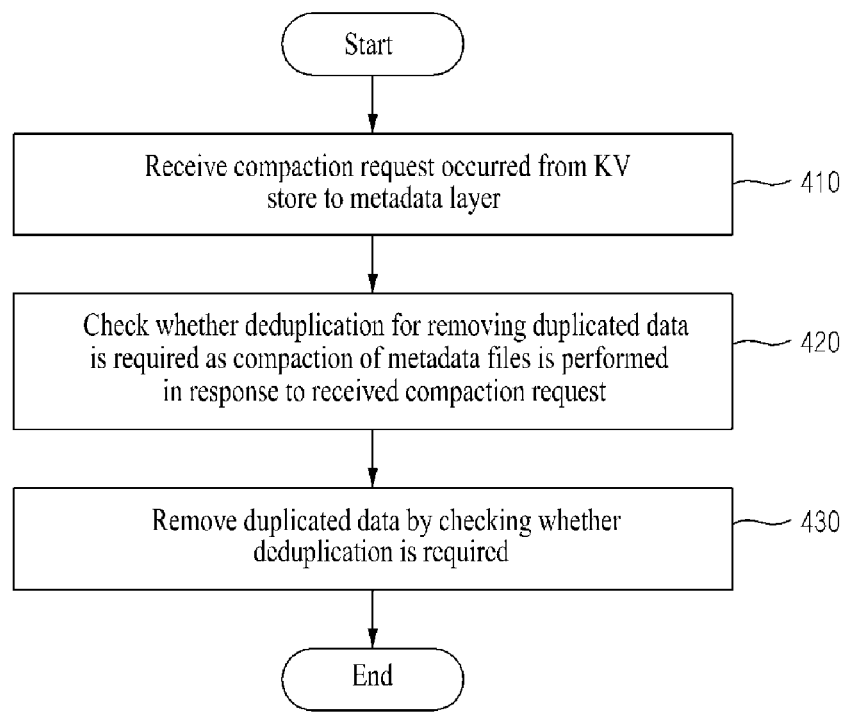
FIG. 4 is a diagram for describing a deduplication-extended compaction method in the key-value store according to an embodiment.

FIG. 4 is a diagram for describing a deduplication-extended compaction method in a KV store according to an embodiment.

At step 410, the KV store may receive a compaction request occurred from the KV store to the metadata layer.

At step 420, the KV store may check whether deduplication for removing duplicated data is required as the compaction of metadata files is performed in response to the received compaction request. The KV store may perform a first process of performing the compaction of metadata and a second process of relocating SSTables based on the metadata updated through the first process. The KV store may continue the metadata compaction for a level that reaches a size threshold in the first process, and may then perform a data deduplication check using the Bloom filter of the metadata when completing the first process and the second process. In this case, the Bloom filter may check whether a KV item is present without reading the metadata. The amount of the duplicated data may be calculated using the Bloom filter.

At step 430, the KV store may remove the duplicated data by checking whether the deduplication is required. As the KV store performs the data deduplication check using the Bloom filter of the metadata, a positive result or a negative result may be returned from the Bloom filter. When the negative result is returned, a key may be skipped. When the positive result is returned, a key may be inserted into a duplication log (dup_log). Accordingly, in order to record a duplicated key with reference to the location of the metadata, a duplication log file may be implemented. In the compaction procedure, a duplicated KV item may be removed from the disk after a duplication loss file, and the space can be secured. When performing the data duplication check using the Bloom filter, the KV store may check the duplicated key of the metadata at a lower level, may calculate a duplication ratio, and may check a threshold for checking whether next deduplication is required based on a value of the calculated duplication ratio. The KV store may determine whether next deduplication for removing duplicated data is required by checking the threshold, may extend the compaction of the metadata to a lower level when the value of the duplication ratio is a preset reference or less, and may automatically delete the duplicated data.

Figure 5:
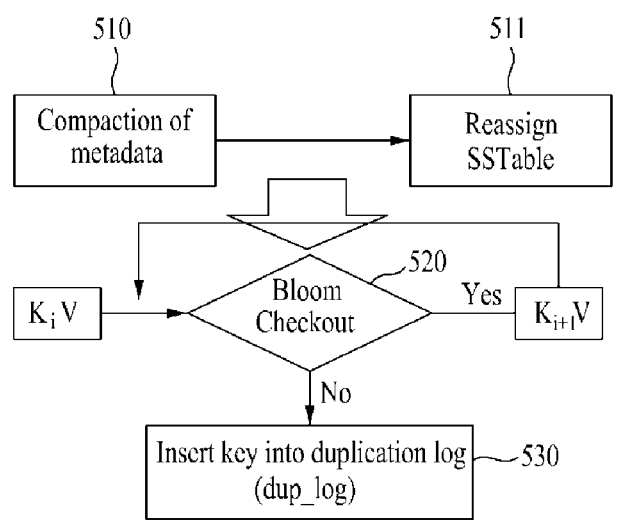
FIG. 5 is a flowchart for describing a deduplication check method of the key-value store according to an embodiment.

FIG. 5 is a flowchart for describing a deduplication check method of a KV store according to an embodiment.

A KV store (CaseDB) may perform deduplication-extended compaction on a lower level. Through such a method, the SAR can be reduced, and the balance of a space amplification ratio (SAR) and a write amplification ratio (WAR) can be maintained. An implementation of the deduplication-extended compaction method focuses on eliminating a space amplification problem in the CaseDB, and provides a reliable and flexible KV store for mixed workload applications. The deduplication extended compaction technique can resolve the problem by performing compaction in a lower level when the deduplication ratio reaches a threshold. Moreover, the deduplication extended compaction method can maintain a reliable balance between space amplification and write amplification. If compaction is performed in a lower level, frequency is not increased, and latency is extended. In other words, the proposed method does not perform compaction based on deduplication, and may perform deduplication upon each compaction occurrence. If compaction with the deduplication checking process is delayed, extra I/O occurs, but this process affects only duplicated data and requires considerably low costs compared to the execution of compaction from the beginning.

FIG. 5 illustrates a flowchart and procedure for extended compaction along with data deduplication checkout of CaseDB architecture. The CaseDB compaction process may be divided into two parts. In Part 1, metadata compaction may be performed (510), and in Part 2, SSTables may be relocated according to updated metadata (511). Part 1 may continue for all levels that reach a size threshold. After finishing both the parts, data duplication checkout (520) may start. A data duplication checkout (DedupCheckout( )) method may include only all lower levels that Part 1 did not reach. In the data duplication checkout (DedupCheckout( )) method, Bloom filters play a crucial role in checking the existence of KV items without reading metadata. In this step, each updated key in upper levels may be checked and marked as duplicated data. As described above, the Bloom filter returns a positive or negative result. It is guaranteed that data is not available in a set when feedback is negative. Accordingly, a key will be skipped after a negative result. In a next process, a next result may be repeated. Furthermore, the probability of false positives is reduced as small as possible in the CaseDB, so the data duplication checkout (DedupCheckout( )) assumes a key is present in a metadata file when the feedback of the Bloom filter becomes positive and inserted into the duplication log (dup_log) file. Although the key is not present in a set, extended compaction finds the key in next steps, which does not affect data consistency. Therefore, the duplication checkout process runs surprisingly fast by only involving Bloom filters.

$$DUP\_RATIO = TOTAL\_KEYS/DUP\_KEYS \quad (1)$$

After checking all lower levels for duplicated keys, a duplication ratio may be calculated using Equation 1. Equation 1 may depend on two variables for calculating the duplication ratio. One variable is a total number of keys that can easily be extracted from metadata files, and the other variable is the number of duplicated keys, which may be used in the duplication log (dup_log) file initialized in a previous step. A calculated value is used in a next step to check a threshold for deduplication. From Equation 1, it can be easily seen that a higher value for the duplication ratio (DUP_RATIO), frequency of deduplication increases and better results are guaranteed in terms of space amplification. Furthermore, the total number of keys also includes the number of keys in upper levels on which compaction has already been performed, and the number of duplicated keys includes only lower levels. Accordingly, a total key (TOTAL_KEYS) is always higher than DUP_KEYS. Even if all keys are duplicated at lower levels, a value of the duplication ratio (DUP_RATIO) never reaches 1. Accordingly, it is recommended to use a bigger threshold value for better performance.

FIG. 6 is an example for describing a deduplication-extended compaction algorithm of a KV store according to an embodiment. In Line 15 of FIG. 6, whether deduplication is required may be determined by checking a threshold. When a value of the duplication ratio (DUP_RATIO) is small, compaction may be extended to all lower levels, and duplicated data may be automatically removed. The balance of the WAR and the SAR may be managed by altering a deduplication threshold according to system needs and workloads.

The aforementioned device may be implemented by a hardware component, a software component and/or a combination of a hardware component and a software component. For example, the device and components described in the embodiments may be implemented using one or more general-purpose computers or special-purpose computers, like a processor, a controller, an arithmetic logic unit (ALU), a digital signal processor, a microcomputer, a field programmable gate array (FPGA), a programmable logic unit (PLU), a microprocessor or any other device capable of executing or responding to an instruction. The processor may perform an operating system (OS) and one or more software applications executed on the OS. Furthermore, the processor may access, store, manipulate, process and generate data in response to the execution of software. For convenience of understanding, one processing device has been illustrated as being used, but a person having ordinary skill in the art may understand that the processor may include a plurality of processing elements and/or a plurality of types of processing elements. For example, the processor may include a plurality of processors or a single processor and a single controller. Furthermore, a different processing configuration, such as a parallel processor, is also possible.

Software may include a computer program, a code, an instruction or a combination of one or more of them and may configure a processor so that the processor operates as desired or may instruct the processor independently or collectively. The software and/or the data may be embodied in any type of machine, component, physical device, virtual equipment or computer storage medium or device in order to be interpreted by the processor or to provide an instruction or data to the processor. The software may be distributed to computer systems connected over a network and may be stored or executed in a distributed manner. The software and the data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure alone or in combination. The program instructions stored in the medium may be specially designed and constructed for the present disclosure, or may be known and available to those skilled in the field of computer software. Examples of the computer-readable storage medium include magnetic media such as a hard disk, a floppy disk and a magnetic tape, optical media such as a CD-ROM and a DVD, magneto-optical media such as a floptical disk, and hardware devices specially configured to store and execute program instructions such as a ROM, a RAM, and a flash memory. Examples of the program instructions include not only machine language code that is constructed by a compiler but also high-level language code that can be executed by a computer using an interpreter or the like.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

The embodiments of the invention in which an exclusive property or privilege is claimed are defined as follows:

1. A data deduplication method for an edge computer, which is performed in a key-value store persistent storage, the data deduplication method comprising:

receiving a compaction request occurred from the key-value store persistent storage to a metadata layer having upper levels and lower levels, wherein compaction has previously occurred on the upper levels, wherein the compaction includes a deduplication process for removing duplicating data;

checking whether deduplication for removing duplicated data is required by using a Bloom filter of metadata to check whether a key-value item is present via a processor when compaction of a metadata file is performed in response to the received compaction request; and removing the duplicated data in response to the deduplication being required, via the processor, wherein removing the duplicated data comprises:
  determining a number of duplicated keys of the metadata at only the lower levels when the data duplication check is performed using the Bloom filter,
  calculating a duplication ratio, wherein the duplication ratio is determined by a total number of keys divided by the number of duplicated keys, wherein the total number of keys is determined from the metadata layer,
  comparing a value of the calculated duplication ratio with a threshold to determine whether a next deduplication process for removing duplicated data is required,
  determining that the next deduplication process for removing duplicated data is required in response that the value of the duplication ratio is equal or less than the threshold, and
  extending a compaction of the metadata to the lower level, and automatically removing the duplicated data from the persistent storage in the next deduplication process.

2. The data deduplication method of claim 1, wherein checking whether the deduplication is required comprises performing a first process of performing compaction of the metadata in the key-value store and a second process of relocating string-sorted tables (SSTables) based on the metadata updated through the first process.

3. The data deduplication method of claim 2, wherein:
checking whether the deduplication is required comprises continuing the compaction of the metadata for levels reaching a size threshold in the first process and then performing a data deduplication check using the Bloom filter of the metadata when the first process and the second process are completed, and
the Bloom filter checks whether the key-value item is present without reading the metadata.

4. The data deduplication method of claim 1, wherein removing the duplicated data comprises:
  returning a return value from the Bloom filter when a data deduplication check is performed using the Bloom filter, the return value being a positive result or a negative result,
  skipping a key in response to when the return value is a negative result, and
  inserting a key into a duplication log (dup_log) file when the return value is a positive result.

5. A key-value store for data deduplication for an edge computer, comprising:
  at least one processor configured to execute a computer-readable instruction included in a memory,
  wherein the at least one processor is configured to:
  receive a compaction request occurred from the key-value store persistent storage to a metadata layer having upper levels and lower levels, wherein compaction has previously occurred on the upper levels, wherein the compaction includes a deduplication process for removing duplicating data,
  check whether deduplication for removing duplicated data is required by using a Bloom filter of metadata to check whether a key-value item is present when compaction of a metadata file is performed in response to the received compaction request, and
  remove the duplicated data in response to the deduplication being required, wherein removing the duplicated data comprises:
    determining a number of duplicated keys of the metadata at only the lower levels when the data duplication check is performed using the Bloom filter,
    calculating a duplication ratio, wherein the duplication ratio is determined by a total number of keys divided by the number of duplicated keys, wherein the total number of keys is determined from the metadata layer,
    comparing a value of the calculated duplication ratio with a threshold to determine whether a next deduplication process for removing duplicated data is required,
    determining that the next deduplication process for removing duplicated data is required in response that the value of the duplication ratio is equal or less than the threshold, and
    extending a compaction of the metadata to the lower level, and automatically removing the duplicated data from the persistent storage in the next deduplication process.

* * * * *